Nov. 17, 1970   G. H. RAYMOND   3,540,234
LIQUIDIZER DISENGAGEABLE DRIVE COUPLING
Filed Nov. 29, 1968
2 Sheets-Sheet 1

INVENTOR.
GORDON H. RAYMOND
BY
Harbaugh & Thomas
ATTY'S

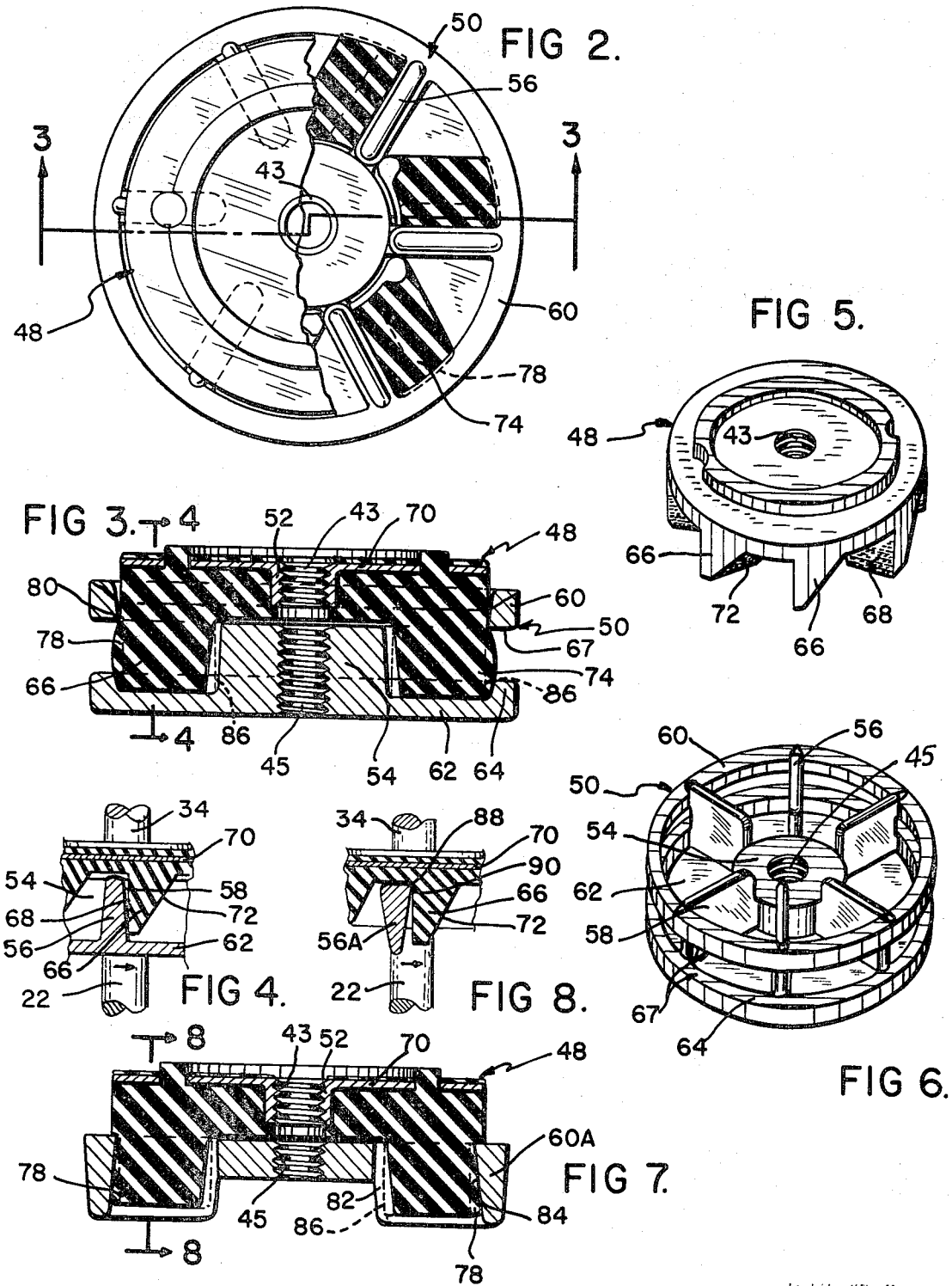

United States Patent Office 3,540,234
Patented Nov. 17, 1970

3,540,234
LIQUIDIZER DISENGAGEABLE DRIVE COUPLING
Gordon H. Raymond, Southington, Conn., assignor to Dynamics Corporation of America, Waring Products Division, New Hartford, Conn., a corporation of New York
Filed Nov. 29, 1968, Ser. No. 780,131
Int. Cl. F16d 3/14, 3/64
U.S. Cl. 64—14          12 Claims

ABSTRACT OF THE DISCLOSURE

Releasable coupling means in which one member has radiating spokes peripherally joined by a ring having space axially therebelow extending in a radial direction and the other member has axially extending resilient teeth freely received between the spokes with the free ends of the teeth centrifugating into said space in interlocking relationship with the ring when the coupling is running at working speeds.

BACKGROUND OF THE INVENTION

Detachable members have been employed heretofore having one or more resilient drive elements to quiet the action of interengaging coupling members in liquidizers where there generally is some variant mis-alignment between a motor shaft and a cutter driving shaft journalled in the bottom of a container that is supported on top of the motor housing. Although manual disengagement while running has been provided for light containers or lightly loaded containers the coupling parts free themselves automatically, become disengaged and are flipped off on occasion with disconcerting results. Unless the container is sufficiently held tightly on the motor housing by the anti-rotational relationship generally provided between the container and housing irrespective of the coupling, this disengaging can become an aggravation to the user. In these instances, manual removal while the liquidizer is running is a test of skill.

Reference is made to the Seyfried Pat. No. 2,755,900 and Dewenter Pat. No. 3,064,949 as earlier couplings involving resilient elements for a general understanding of the background of the prior art.

SUMMARY OF THE INVENTION

In the present invention two embodiments are shown of the inventive concept. In one, detachability of the coupling elements is desirably most difficult while running and this difficulty is related to the speed of rotation. In the other one detachability may easily be attained with a slight tipping of the container to start manual disengagement and little, if any, difficulty remains to complete the disengagement safely.

Flexible teeth on one coupling member flex radially outwardly at their outer ends along the driving faces of the spokes into a space provided beyond a ring element that peripherally joins the drive spokes. In one embodiment, the space and engagement with the ring is quite sharp for interlocking while in the other the space is somewhat conically tapered towards the bases of the teeth for manual release while running.

A further advantage is also derived with the invention in that instead of forming the spokes with a female casting die that is withdrawn in the direction of the engaged radial edges of the spokes, the formation of the spokes can be made by a die having a larger draft angle which when withdrawn in the opposite direction provides a forward incline to the spoke faces as well as providing radial space for centrifugal occupation.

Not only does the present invention eliminate vibrational pounding on bearings causing noise and leakage due to mis-alignment of shafts but it establishes a self balancing engagement that runs quietly and provides a novel self tightening drive relationship against inadvertent separation which under load can be designed to require any selected degree of effort to manually disengage without damage to any parts or danger to the user.

It furthermore provides a primary interengaging drive relationship at the base of the resilient teeth without deflecting the resilient teeth, yet resiliently accommodates mis-alignments by compression of the resilient material where the teeth have the most stock. This is true whether the mis-alignment of the shafts in a liquidizer be lateral or angular.

Moreover, since the cutters in liquidizers impose a radial and downward thrust on the liquid contents of a jar to induce upward flow along the jar wall, the present coupling runs without axial thrust in an upward direction which otherwise occurs with many axial toothed coupling engagements. In fact, in the preferred embodiment a downward thrust at the coupling is mildly induced in relation to the shaft speed which tends to counteract any upward movement under work conditions.

These being among the purposes and objects of the invention, other and further objects and desirable results will become apparent from the following description relating to the drawings in which:

FIG. 2 is a plan view of the coupling, partly in section, of one of the embodiments;

FIG. 3 is a sectional view taken on line 3—3 in FIG. 2;

FIG. 4 is a central vertical sectional view taken on line 4—4 in FIG. 3;

FIGS. 5 and 6 are perspective views of the two coupling members in disengaged coaxially aligned relationship;

FIG. 7 is a view similar to FIG. 3 illustrating another embodiment of the invention; and FIG. 8 is a sectional view taken on line 8—8 of FIG. 7.

Figure 1:
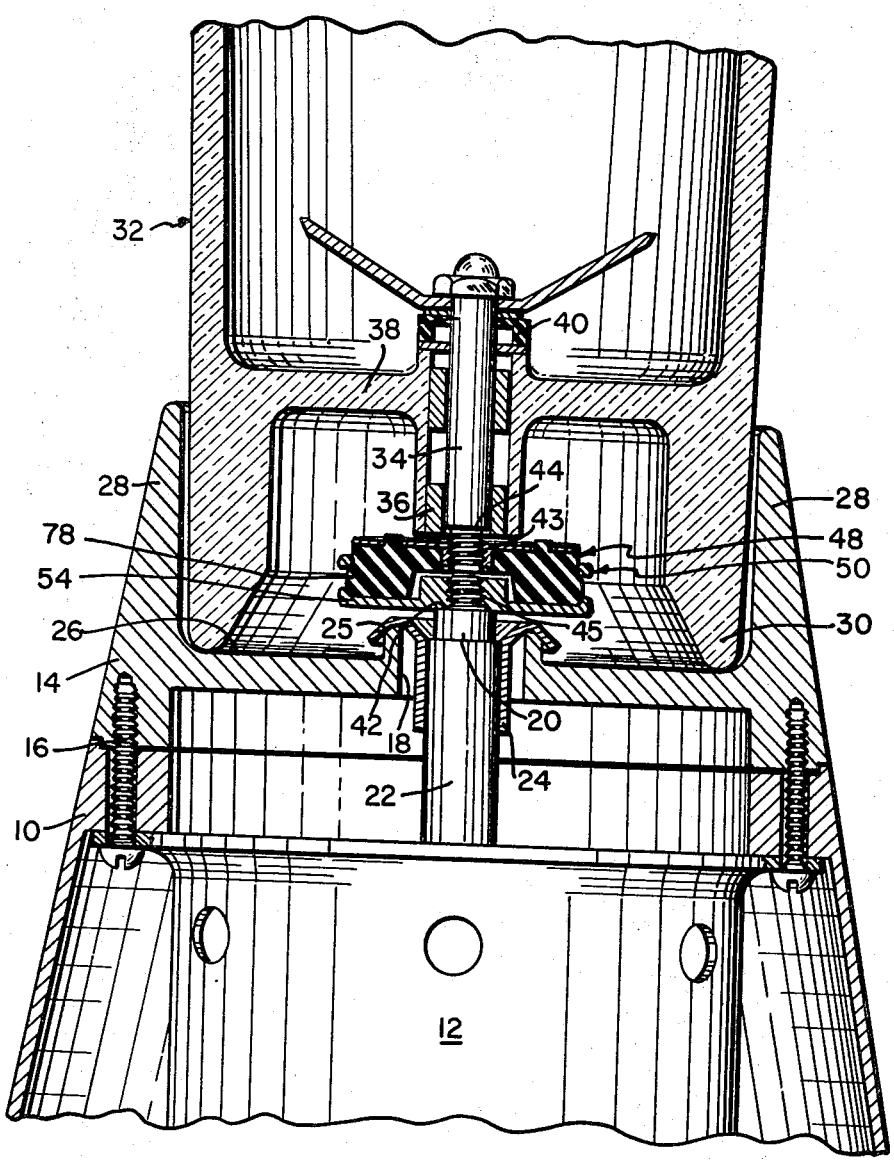
FIG. 1 is a vertical sectional view of a blender embodying the invention.

A liquidizer is illustrated in FIG. 1 having a power unit comprising a housing portion 10 supporting a motor 12 and a cover member 14 as secured in assembled relation by screws 16. The cover member has an opening 18 in the center through which the upper end 20 of the motor shaft 22 extends as protected at the opening against drippage by a ferrule 24 having a liquid shedding running seal collar 25.

The upper face 26 of the cover member marginally has a plurality of upstanding prongs 28 which receive the base 30 of a liquidizer jar 32 in guided non-rotative relationship to rest upon the top of the cover member 14 in freely releasable relation from a position coaxial with the motor shaft. A stub shaft 34 is journaled by bearings 36 in the bottom 38 of the jar and on its upper end receives a liquid seal 40.

The adjacent ends of the two shafts 22 and 34 are threaded and of reduced diameter to provide facing shoulders 42 and 44 with the threaded portions having a lead that is self-tightening under the torque transmitted so that they receive coupling members 48 and 50 thereon in squared driving relation.

The drive shaft 22 of the motor and the driven shaft 34 carrying the cutters are substantially coaxial in operation and therefore the shoulders support the coupling members 48 and 50 in parallel relationship so that they do not wobble and induce separation. This in combination with the novel construction of the coupling members operates to prevent inadvertent separation when the motor is running with a particularly light container in place or a heavy torque load is being transmitted.

Reference is made to FIGS. 3 and 4 in which the engaging members 48 and 50 have centrally threaded metal members 52 and 54 with threaded opposing openings 43 and 45 for receiving the two shafts 34 and 22, respectively, against shoulders 44 and 42 in drive relationship. Although either one can be used as the drive member, it is preferred that the one having minimal irregularities be used on the motor shaft and this happens to be the member 54 which is preferably all metal, defining spokes 56 whose leading faces 58 are drive faces disposed radially and whose outer ends have circumferentially projected elements which may be joined to form a ring 60. Although a bottom wall is not essential, one is shown at 62 that is integrally formed with the lower radial edges of the spokes and marginally provides an annular flange 64 around its periphery that is concentric with the ring 60. An expansion space 67 between the ring 60 and the flange 62 opens radially outwardly at the drive faces of the spokes.

The other member 48 on the cutter bearing shaft 34 comprises an embedded metal plate 70 to which is bonded teeth 66 of a moderately resilient elastomer. The teeth are circumferentially and angularly spaced and their drive faces 68 are perpendicular to the plane of the plate 70. The trailing sides 72 are inclined to the drive faces to provide for easy engagement of the coupling members and to strengthen the teeth under torque loads. The circumferential periphery 74 of the teeth are loosely received within and extend below the ring 60 a substantial distance. Then when the coupling is revolving at liquidizing speeds a centrifugal force is induced which acts upon the resilient teeth so that they stretch or expand outwardly as at 78 into the expansion space 67 below the ring. This expanded relationship interlocks the two elements as long as they interdrive at liquidizing speeds and this interlock holds the jar 32 from being flipped upwardly by any possible rearward inclination of the drive faces that is induced by torque. In fact, with this embodiment, due to the squarness of the lower inner edge 80 of the ring portion with the elastomer 78 expanded below it, it is desirably difficult to disengage the coupling members inadvertently, or otherwise, until the motor and cutters are stopped. Moreover, the interlocking relationship at the ring edge 80 inhibits any flexure of the teeth under load which might tend to separate the coupling members and impose an end thrust upon the cutter shaft.

In this particular embodiment the spokes 56 are die cast for uniformity and balance, and their upper radial edges may be rounded with the sides 58 of the spokes tapering thereto as shown in FIG. 4 for the easy release and withdrawal of the forming die. The taper however is in the direction which tends to cam separation of the coupling members which under vibration could be augmented if it were not for the anchoring effect established by the expansion of the periphery of the teeth 66 outwardly behind the ring 60 by centrifugal force preventing any separation movement.

Although it is a matter of selection it is preferred that the spoke member be mounted on the motor shaft which is exposed when the jar is removed because with the ring construction provided thereon there is little likelihood of personal injury or damage if it is touched when the motor is turned on or tested. The toothed element 48 is protected within the jar bottom and is not rotated unless engaged with the spoke member.

Another embodiment is shown in FIGS. 7 and 8 in which all metal spoke members 82 have a circumferential ring 60A but no bottom wall. The spoke members are novelly cast with a downward taper of their forming die thereby tapering its spokes 56A and enlarging the spaces between the spokes downwardly and particularly outwardly as at 84 (FIG. 7) with respect to the ring 60A. In fact, this taper is accentuated for the reasons mentioned and particularly for the inner face 84 of the ring 60A. The resting shape of the teeth are shown in FIG. 5, and in FIG. 7 are shown in dotted lines 86 by which, it will be noted, they easily clear the spokes 56A and ring 60A for engagement.

The outer portions of the teeth in FIG. 3 adjacent their tip ends centrifugate outwardly into the spaces 78 to provide a frictional coupling interengagement at high speeds for the purposes explained. In the embodiment in FIG. 7 the further advantage is attained in that the upper leading edges 88 (FIG. 8) of the spokes 56A are at a slightly acute leading angle to engage the teeth 66 at their roots 90 without deflecting them as in conventional arrangements which tend to cam the couplings apart under torque. In this embodiment, the interengagement force is essentially frictional and the displacement of centrifugated elastomeric material for disconnection is cammed inwardly gradually. Both the frictional and the displacement factors involve the radial weight of the centrifugated material which can be varied for different liquidizers by varying the diameter of the coupling, varying the angle of the taper on the ring 60A engaged by the centrifugated elastomer, or by varying the hardness of the elastomer, or doing all these things.

Thus, it can be observed in this embodiment that the force components and angles can be so provided and arranged whereby the jar can be removed in an emergency if desired without damage by wiggling it slightly while lifting it.

Accordingly, it will be appreciated by those skilled in the art how the stated objects are attained and how various further modifications can be made without departing from the spirit of this invention.

What is claimed is:
1. In a liquidizer having axially aligned motor drive shaft and cutter carrying drive shaft a disengageable drive coupling means comprising,
  a coupling member having circularly arranged axially extending resilient teeth thereon,
  a second coupling member having radially extending spokes thereon detachably intermeshing with said teeth in torque transmitting relationship therewith and including
  a circumferential member carried by the spokes at a predetermined axial height on said spokes adjacent to the roots of said teeth to define a space between the spokes beneath the circumferential member remote from the first coupling member into which portions of the teeth that are remote from their roots may centrifugate in interengaging relationship with said circumferential member.

2. A torque coupling member comprising a hub portion apertured to be received on the end of a shaft in driving relationship,
  a plurality of radiating spokes carried by said hub having axially extending radially oriented driving faces, and
  ring means interconnecting the outer corners of the spokes remote from the shaft and defining a radial space axially beneath the ring on the shaft side of the ring.

3. The coupling member defined in claim 2 in which the spokes taper towards the shaft side of said coupling member.

4. The coupling member defined in claim 2 in which the internal face of the ring means diverges radially outwardly towards the shaft side of said coupling.

5. In a liquidizer having coaxially disposed drive and driven shafts carried by a motor and a removable jar, respectively, the adjacent ends of the shafts being reduced in diameter to provide shoulders in parallel planes with the reduced ends threaded,
  a driven coupling member having a threaded plate received on the driven shaft against the shoulder thereon on one side and having bonded thereto a resilient body of elastomer material shaped to provide on the other side axially extending circumferentially spaced tapering teeth having drive engaging substantially planar surfaces whose planes essentially include the axis of rotation.

a drive coupling member having a threaded hub portion received on the drive shaft against the shoulder thereon and including a plurality of radiating spokes carried by said hub and intermeshing with said teeth and having axially extending radially oriented driving faces engaging said planar surfaces, means interconnecting the outer portions of the spokes beyond the bases of said teeth at their bases and defining a space radially beyond the radial resting positions of the ends of the teeth, portions of said free ends of said teeth moving from their resting positions under centrifugal force into said space to assume a radius greater than the minimum radius of said ring.

6. The combination called for in claim 5 in which said spoke interconnecting means defines a wall engaged by said centrifugated portions which progressively accommodate any axial mis-alignment of the shafts without localized radial strain upon the shafts.

7. The combination called for in claim 6 in which the radially inner wall of said interconnecting means expands radially outwardly away from the roots of said teeth to define the radial limits of said space into which portions of said teeth are centrifugally moved.

8. The combination called for in claim 7 in which said teeth are unreinforced elements of a solid resilient elastomeric material.

9. The combination called for in claim 5 in which a cup shaped member supports the other radial edges of the spokes and includes a cup rim spaced axially from said interconnecting means to define therewith the axial limits of said space receiving centrifugated portions of said teeth.

10. A torque transmitting coupling for coaxial shafts comprising a member mounted on one shaft having circumferentially spaced resilient tooth elements axially elongated towards the other shaft, and a second member having a hub mounted on the other shaft having a plurality of radiating spokes carried by said hub intermeshing with said teeth and having axially extending radially oriented driving faces engaging said tooth elements, ring means interconnecting the outer portions of the spokes and defining a radial space axially beneath the ring means on the shaft side of the ring adjacent the free ends of said tooth elements, said tooth elements terminally centrifugating radially behind said ring means during rotation of the shafts.

11. The coupling called for in claim 10 in which the spokes taper towards the free ends of said tooth elements whereby the spokes engage the tooth elements at their root positions.

12. The coupling defined in claim 10 in which the internal face of the ring means diverges radially outwardly towards the shaft side of said coupling to provide a wall inclined towards the one shaft.

References Cited
UNITED STATES PATENTS

| | | | |
|---|---|---|---|
| 1,548,629 | 8/1925 | Pfander | 64—14 |
| 2,755,900 | 7/1956 | Seyfried. | |
| 3,064,949 | 11/1962 | Dewenter | 64—14 XR |
| 3,257,827 | 6/1966 | Hughes | 64—14 XR |

JAMES A. WONG, Primary Examiner

U.S. Cl. X.R.
64—27; 259—108